United States Patent Office 3,040,104
Patented June 19, 1962

3,040,104
PURIFICATION OF POLYHYDRIC ALCOHOLS
John W. Sarappo, New Castle, and Harold F. Kalbach, Wilmington, Del., assignors to Atlas Chemical Industries, Inc., a corporation of Delaware
No Drawing. Filed May 11, 1959, Ser. No. 812,086
5 Claims. (Cl. 260—637)

This invention relates to the manufacture of polyhydric alcohols and more particularly to a process for the purification of polyhydric alcohols manufactured by the hydrogenation of carbohydrates.

In the production of polyhydric alcohols, by the catalytic hydrogenation of aqueous sugar solutions, the autoclave discharge product after separation of the hydrogenating catalyst inevitably contains minor proportions of impurities besides the desired hexitols and water. These result from incomplete hydrogenation of the sugars present, from impurities present in the sugar employed as the raw material, and from side reactions in the hydrogenation autoclave which reactions may have involved either the sugar of the raw material or impurities contained therein.

The present commercial practice is to minimize the concentration of the impurities in the reduced polyhydric alcohol solutions by employing sugar of high purity as the feed stock, hydrogenating as close to equilibrium as possible, treating with adsorbents, such as activated carbon, to remove adsorbable impurities, particularly color bodies, and treating with ion-exchange resin to remove ionizable impurities. It has been proposed to remove residual reducible sugars by heating the polyhydric alcohol composition with an alkali metal hydroxide or other basic substance to effect substantial alkaline degradation of the reducing sugar, and ion-exchanging the resulting solution to remove the acidic degradation products formed and the alkaline material introduced. This process is effective only with respect to reducing sugars. If the hydrogenation has been carried close to equililibrium so that the reducing sugar content is low the purification effected is small, and if the reducing sugar content before the treatment is high the amount of alkali required and the amounts of acidic degradation products formed are large, rendering the load on the ion-exchangers objectionably heavy.

In accordance with the present invention, polyhydric alcohol compositions are purified by heating them in neutral or faintly acid aqueous solution, cooling the solution, and passing the heat treated material through a cation-anion exchange system. In many cases a precipitate is formed in the solution during the heat treatment which may be, and preferably is, filtered from the solution before the ion-exchange treatment.

The chemistry involved in the purification effect is not fully understood and, indeed, the nature of the purification reaction seems to vary somewhat with the raw material employed in the hydrogenation step and with the extent of purification to which the reduced solution has been subjected before the heat-treating step of the invention is applied. The effect in every case, however, is to lower sugar contents with respect to both reducing and non-reducing sugars, and to improve the color and heat stability of the polyhydric alcohol composition.

The concentration of polyhydric alcohol in the aqueous solution which is heated under pressure in accordance with the invention is not critical and may be chosen to coincide with that of the process solutions employed in the hydrogenation step or in the conventional purification steps. Thus, solutions ranging in concentration from about 25% to 80% by weight of polyhydric alcohol may be employed. A preferred range is from 50% to 70%.

The temperature during the heat treatment step should be at least 175° C. and not more than about 250° C., and the time of heating should be at least 10 minutes and not more than about 3 hours. In general, when the treating temperature is at the low end of the range, the time of heating should be towards the upper limit of the recited range. At higher temperatures the time may be shortened. A preferred time-temperature schedule is to heat treat the polyhydric alcohol solution at from 200° C. to 225° C. for approximately an hour.

Since the temperature of heat treatment is above the normal boiling point of the aqueous solutions, the pressure will be super-atmospheric.

The pressure need not be more than the vapor pressure of the aqueous solution at the treating temperature. Higher pressures, induced by the inclusion of air or of inert gases in the heating vessel are not objectionable in the process.

During the heat treatment step the solution should be neutral (pH 7) or faintly on the acid side. Good results are obtained when the pH is as low as about 4 but it is preferred to operate in the pH range of from 5 to 6. Adjustment of the pH, if necessary, may be effected by the addition of small amounts of acid or alkalis or by treatment with a suitable ion-exchange material.

The heat treatment may be applied directly to the product of the hydrogenation autoclaves, after separation of the hydrogenation catalyst, in the presence or absence of hydrogen. Alternatively it may be applied to process solutions which have been subjected to purification steps such, for example, as treatment with activated carbon and/or ion-exchange.

After the heat-treated polyhydric alcohol solution is cooled it is subjected in conventional manner to cation-anion exchange treatment. If, as often happens, a precipitate has been formed in the solution as a result of the heat treatment the solution is preferably filtered before it is sent to the ion-exchanger.

The removal of ionizable substances from aqueous organic solutions by cation-anion exchange treatment is a well developed art and suitable ion exchangers for use in practice of the invention are readily available. If the heat treated polyhydric alcohol contains appreciable quantities of metallic cation it is highly preferred to employ a cation exchanger of the strongly acidic, or salt-splitting, type in the hydrogen form. The anion exchanger may be of the weakly basic or strongly basic type in the hydroxide form. The exchange may be conducted step wise, i.e., by passage through beds of cation exchange and anion exchange resin in sequence or in a mono-bed of mixed cation and anion exchange resins, all as well understood in the art. If the ion-load is heavy it may be found preferable to use a multi-bed system comprising a series of cation and anion exchange resins in alternating sequence.

In the following examples the process of the invention is more specifically illustrated and the characteristics of polyhydric alcohol solutions produced in accordance with the invention are compared with those of prior art processes.

*Example I*

The polyol solution subjected to the treatment was the product of catalytic hydrogenation of a defecated high test molasses, which solution had been purified in accordance with accepted prior art practice by subjection to a thorough cation-anion exchanging process, followed by treatment with activated carbon. The pH of the solution was approximately 6.0.

750 ml. of the polyol solution, containing approximately 440 grams of solids, were charged into a rocking autoclave of approximately 3 liter capacity and sealed up in the presence of air. While rocking the autoclave to keep the contents agitated the temperature was taken to 200° C. and held for one hour. A pressure of 190 pounds per square inch gauge (p.s.i.g.) was generated in the system. The reactor and contents were cooled quickly, the solution filtered and passed through an ion exchange system consisting of granular beds of a strongly acidic cation exchange resin (Permutit Q) and a strongly basic anion exchange resin (Permutit SK) in series.

The cation exchange resin had been put in its hydrogen form by passing therethrough 3.25 bed volumes of 5% sulfuric acid solution, at a rate equivalent to 0.81 gallon per minute per cubic foot of resin, followed by 13.0 bed volumes of demineralized water to remove excess acid. The anion exchange resin had been put in its hydroxyl form by passing therethrough 2.3 bed volumes of 4% sodium hydroxide solution at a rate equivalent to 0.81 gallon per minute per cubic foot of resin followed by 10.0 bed volumes of demineralized water. The heat-treated polyhydric alcohol solution was passed sequentially through the beds of cation exchange resin and anion exchange resin in the order named, at a rate equivalent to 0.38 gallon per minute per cubic foot of resin.

The following table compares the properties of the polyol solution before and after treatment in accordance with the invention.

| Solution | Reducing Sugar, Percent Dry Basis | Total Sugar, Percent Dry Basis | Heat Stability Color | Visual Color |
|---|---|---|---|---|
| Before Treatment | 0.43 | 0.75 | 340 | 0.0143 |
| After Treatment | 0.06 | 0.06 | 86 | 0.0050 |

In the foregoing table, and in characterizing products of the other illustrative examples to follow, the reported concentration of reducing sugar refers to the apparent reducing sugar content as determined by the reduction of Fehling's solution; the reported total sugar refers to the apparent reducing sugar content after acid hydrolysis of the polyhydric alcohol solution in accordance with accepted sugar analytical techniques; heat stability color is the color, measured on a Klett-Summerson colorimeter, of a sample of the polyhydric alcohol which has been evaporated to dryness, and heated in the absence of air for one hour at 200° C.; and the visual color is the concentration, in grams per liter, of a potassium dichromate solution which will pass the same intensity of light of 420 millimicrons wave length as a 50% solution of the sample under test. The observed heat stability color has been found to correlate well with the tendency of the polyhydric alcohol to darken when subjected to high temperature reactions as in the formation of fatty acid esters, resinous esters, and the like.

*Example II*

A 750 ml. portion, containing approximately 440 grams of polyhydric alcohol solids, of an unpurified solution obtained by the hydrogenation of defecated high test molasses was treated in a rocking autoclave under the conditions recited in Example I. The pH of the said solution was 5.5. The product was filtered free from the small amount of precipitate formed during the heat treatment and passed through a five-bed ion exchange system consisting of a bed of strongly acidic cation exchange resin (Permutit Q), two beds of a weakly basic anion exchange resin (Duolite A-7), a second bed of the same cation-exchange resin and a bed of strongly basic anion exchange resin (Permutit SK).

For purposes of comparison a sample of the same hydrogenation product was purified by passage through the same ion-exchange system without first subjecting it to the heat treatment of the invention. The properties of the two resulting products are compared in the following table.

| Purification Process | Ion Exchange Only | Heat Treatment and Ion Exchange |
|---|---|---|
| Reducing Sugar, Percent D.B. | 0.13 | 0.02 |
| Total Sugar, Percent D.B. | 0.59 | 0.15 |
| Heat Stability Color | 600 | 93 |
| Visual Color | 0.030 | 0.0115 |

*Example III*

The polyhydric alcohol employed was obtained by hydrogenating a commercial corn sugar of approximately 90 dextrose equivalent, first under substantially neutral conditions and finally in the presence of a small proportion of phosphoric acid.

750 ml. containing 440 grams of solids, of the reduction product in aqueous solution of pH 4.3 was heat treated under the conditions recited in Example I. The resulting solution, after cooling and filtration, was passed through beds of a strongly acidic cation exchange resin (Permutit Q) and a weakly basic anion exchange resin (Duolite A-7) in series.

For purposes of comparison a second portion of the reduced solution was subjected to the same ion-exchange treatment without first heat treating it in accordance with the invention. The reduction in sugar content due to the heat treatment is obvious from the following comparative analyses.

| Treatment | Reducing Sugar, Percent D.B. | Total Sugar, Percent D.B. |
|---|---|---|
| Ion Exchange Only | 0.13 | 0.20 |
| Heat Treated and Ion Exchanged | 0.04 | 0.08 |

EXAMPLE IV

A commercially purified sorbitol solution, prepared by hydrogenation of high purity glucose solution followed by ion exchange treatment, was employed as the starting material. The pH of the solution was 6.2.

860 grams of the aqueous sorbitol solution (70% solids) were introduced into the autoclave employed in the foregoing examples sealed up in the presence of air and heated to 225° C. for one hour. The product was cooled, filtered and passed through beds of a strongly acidic cation exchange resin and a weakly basic anion exchange resin in series. The further purification resulting from the treatment is evident from the following analyses:

| Product | Reducing Sugar, Percent D.B. | Total Sugar Percent D.B. | Heat Stability Color |
|---|---|---|---|
| Commercially Purified Sorbitol | 0.09 | 0.70 | 105 |
| Same, After Heat Treatment and Ion Exchanging | 0.03 | 0.05 | 75 |

Adaptation of heat treatment in accordance with the invention to a continuous process is illustrated in the following example.

*Example V*

The apparatus employed comprised four vertical, heated, tubular reactors, of 8.7 liters capacity each, connected in series and equipped with means for pumping a gas-liquid mixture through the system. The system was pressurized with hydrogen to a total pressure of 470 p.s.i.g. and hydrogen gas was circulated through the reactors to serve as the transporting and agitating means for the liquid. 26 liters per hour of a 50 weight percent solution of the polyhydric alcohol composition obtained by the catalytic hydrogenation of defecated high test molasses, without preliminary purification were put through the reactors. A temperature of 176° C. was maintained in the first reactor which served as a preheater and the remaining three were maintained at 200° C. The residence time in the 200° C. reactors was approximately one hour.

The liquid effluent from the reactors was cooled, filtered and passed through an ion-exchange system consisting of the following resins in series: Permutit Q, Duolite A–7, Duolite A–7, Permutit Q, Doulite A–7, Permutit Q, Permutit SK.

A portion of the polyhydric alcohol composition was subjected to the same ion-exchange treatment without first being subjected to the heat treatment. The comparative properties of the two solutions are shown in the following table:

| Treatment | Ion Exchange Only | Heat Treatment Plus Ion Exchange |
|---|---|---|
| Reducing Sugar, Percent D.B | 0.24 | 0.02 |
| Total Sugar, Percent D.B | 0.60 | 0.09 |
| Heat Stability Color | 350 | 82 |
| Visual Color | 0.018 | 0.0035 |

The foregoing examples are illustrative of the process of the invention and are not to be construed as limiting the scope thereof.

What is claimed is:

1. A process of purifying an aqueous hexitol solution, prepared by the catalytic hydrogenation of a sugar in aqueous solution, which comprises subjecting the said aqueous hexitol solution, after separation of the hydrogenation catalyst therefrom, to a heat treatment of from 175° C. to 250° C. for a period of from 10 minutes to 3 hours in the pH range from about 4 to about 7, under a pressure at least equal to the vapor pressure of said solution, cooling the heat treated solution, and subsequently passing it through a cation-anion exchange system.

2. The process of claim 1 wherein the cation exchanger of the said cation-anion exchange system is of the strongly acidic type.

3. The process of claim 2 wherein the said heat treated solution is filtered before it is subjected to cation-anion exchange treatment.

4. A process of purifying an aqueous hexitol solution, prepared by the catalytic hydrogenation of a sugar in aqueous solution, which comprises subjecting the said aqueous hexitol solution, after separation of the hydrogenation catalyst therefrom, to a heat treatment of from 200° C. to 225° C. for approximately an hour at a pH of from 5 to 6, under a pressure at least equal to the vapor pressure of said solution, cooling the heat-treated solution, and subsequently passing it through a cation-anion exchange system.

5. The process of claim 4 wherein the cation exchanger of the said cation-anion exchange system is of the strongly acidic type.

References Cited in the file of this patent

UNITED STATES PATENTS

| 2,164,268 | Covert | June 27, 1939 |
| 2,463,677 | Brandner | Mar. 8, 1949 |
| 2,759,024 | Kasehagen et al. | Aug. 14, 1956 |